March 18, 1969     K. L. RUGGLES ET AL     3,433,860
METHOD FOR MANUFACTURING A SINK AND VANITY TOP COMBINATION
Filed Dec. 30, 1966                            Sheet 1 of 3
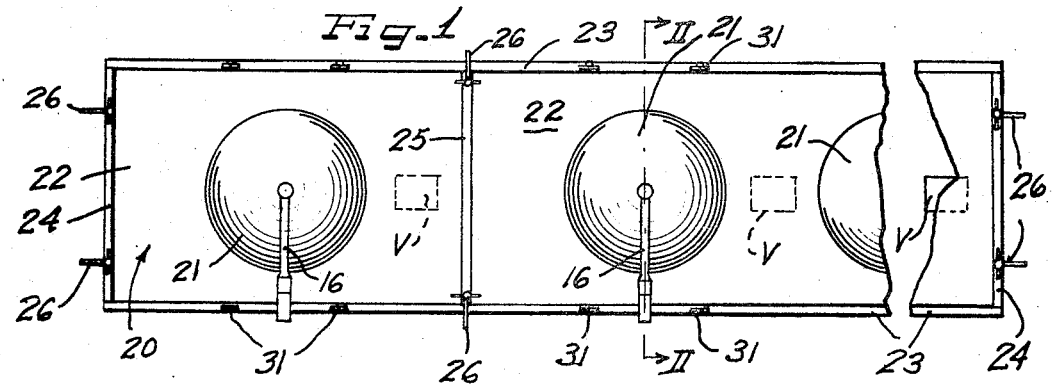
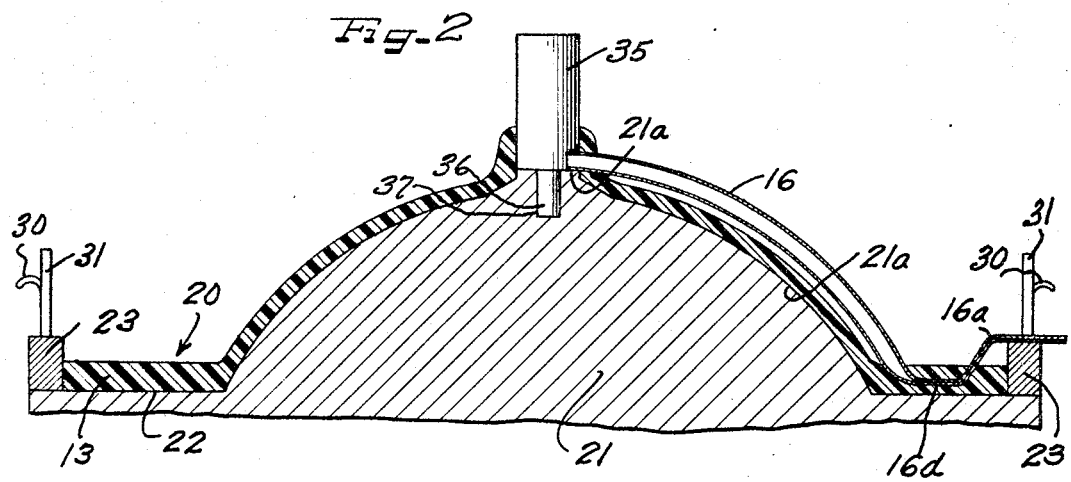
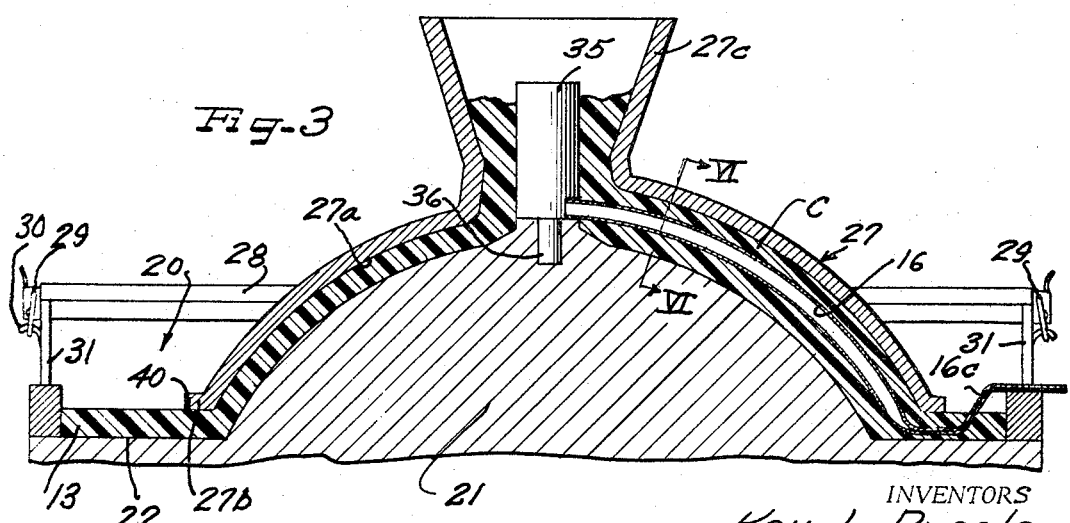
INVENTORS
Kay L. Ruggles
Dale B. Gunnerson
Howard S. Clark
BY                                 ATTORNEYS

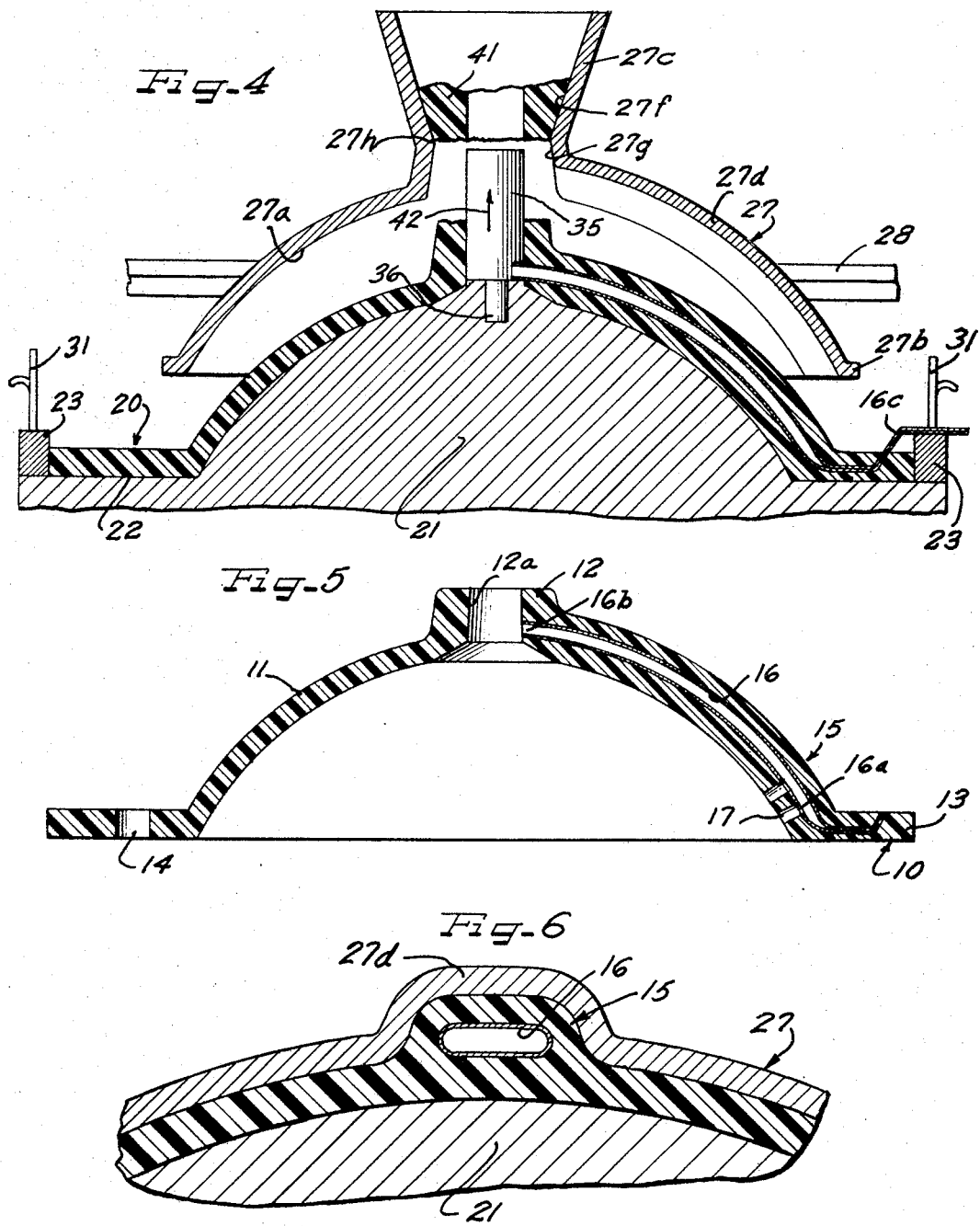

March 18, 1969  K. L. RUGGLES ETAL  3,433,860
METHOD FOR MANUFACTURING A SINK AND VANITY TOP COMBINATION
Filed Dec. 30, 1966  Sheet 3 of 3
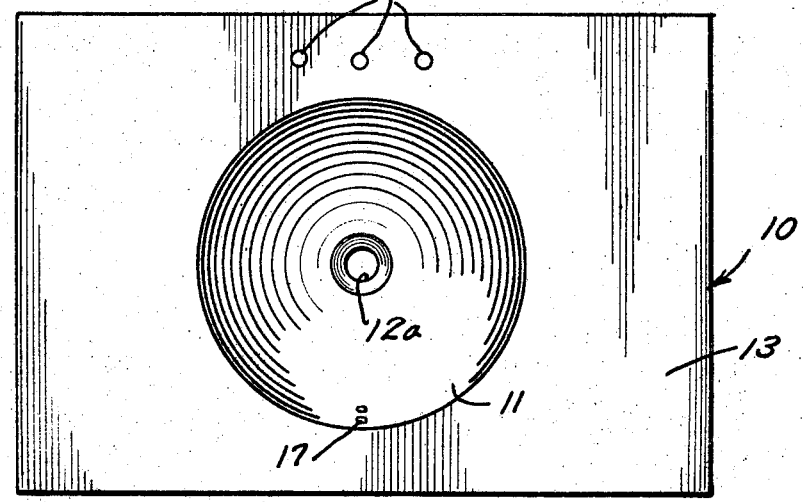
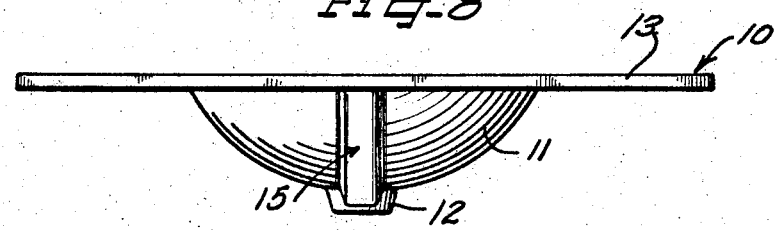
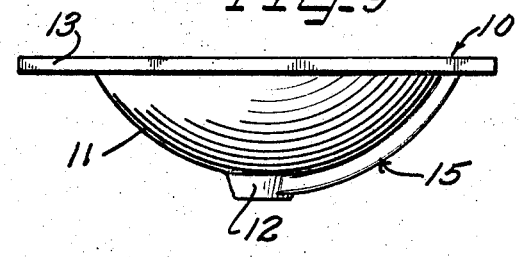
INVENTORS
Kay L. Ruggles
Dale B. Gunnerson
Howard S. Clark
BY Hill, Sherman, Meroni, Gross & Simpson
ATTORNEYS 3,433,860
Patented Mar. 18, 1969

3,433,860
METHOD FOR MANUFACTURING A SINK AND VANITY TOP COMBINATION
Kay L. Ruggles, Dale B. Gunnerson, and Howard S. Clark, Salt Lake City, Utah, assignors, by mesne assignments, to American Standard Inc., New York, N.Y., a corporation of Delaware
Filed Dec. 30, 1966, Ser. No. 606,324
U.S. Cl. 264—71                    13 Claims
Int. Cl. B29c 1/14; B29d 3/02

ABSTRACT OF THE DISCLOSURE

An integral sink and vanity top combination of a thermosetting synthetic plastic composition, preferably of a polyester resin type, wherein the bowl area is integrally formed with the vanity top area. The bowl area is provided with an overflow tube that is embedded within the material of the side wall of the bowl. A method of manufacture of the combination having one or more sink bowls is also disclosed and which method includes the steps of applying appropriate coatings to the mold and thereafter applying an initial pour of the polyester resin into the mold, mounting an overflow tube in proximity to the bowl mold area, then applying a bonnet over the overflow tube and bowl area after the first pour has become tacky, and then making a second pour of the same material into the interior of the bonnet area over the first pour to form the bowl area to shape in integral assembly with the vanity top area. A mineral filler may be added to the resin for the initial flow to produce different desired finishes on the sink and vanity top combination. As the material is permitted to gel the mold is vibrated to permit entrapped gasses to escape to insure a product essentially free of pockets of entrapped air.

BACKGROUND OF THE INVENTION

Field of the invention

The field of invention to which this disclosure is directed pertains to a method of manufacturing an integral sink and vanity top combination.

Description of the prior art

In the past, a number of different types of kitchen and bathroom sinks have been commercially marketed which have been of a metallic composition or of a ceramic composition. In the past, where resins have been used, the vanity top has been formed as a separate unit apart from the bowl, and attaching devices have been employed for mounting the bowls onto a countertop or vanity top. A large number of different systems have been utilized for attaching the bowl to the countertop, and it is well known that a great deal of difficulty has been encountered in an effort to develop a leak-proof system of attachment of the bowl to the countertop of a type that can be conveniently installed and disassembled with a minimum of effort and expense.

SUMMARY OF THE INVENTION

An important object of this invention is to provide a new and improved method of manufacturing an integral sink and vanity top combination where the sink bowl is formed integral with the vanity top and wherein the overflow tube is embedded within a wall of the bowl area.

Still another feature of this invention is concerned with an integral sink and vanity top combination wherein a plurality of sink bowls may be formed in integral assembly with the vanity top thereby eliminating any requirement for attachment rings to join the bowl area with the vanity top.

Yet a further object of this invention is to provide a new and improved method for the manufacture of monolithic, seamless sink and vanity top combinations.

Still another object of this invention is to provide a new and improved method for the manufacture of countertop and bowl combinations where tooling expense can be minimized while allowing great variation in design or shape of the combination and while further enabling the combination to be manufactured at improved production rates.

Other objects and features of this invention will more fully become apparent in view of the following detailed description taken in conjunction with the accompanying drawings illustrating therein a single embodiment.

BRIEF DESCRIPTION OF THE DRAWINGS

FIGURE 1 is a fragmentary top plan view of an apparatus for the manufacture in integral sink and vanity top combinations;

FIGURE 2 is a vertical section taken on the line II—II looking in the direction of the arrows, as seen in FIGURE 1, only showing certain parts in elevation and illustrating a preliminary step in the formation of our method;

FIGURE 3 is a vertical section similar to FIGURE 2 only with the bonnet shown in assembly with a mold and illustrating a subsequent step of our invention;

FIGURE 4 is an exploded view similar to FIGURE 3 only illustrating the manner in which the bonnet is removed from the mold after the poured material has gelled;

FIGURE 5 is a vertical section illustrating our integral sink and vanity top combination similar to FIGURE 4 only illustrating the finished product;

FIGURE 6 is an enlarged fragmentary vertical section taken substantially on the line VI—VI looking in the direction indicated by the arrows as seen in FIGURE 3;

FIGURE 7 is a top plan view of an integral sink and vanity top combination;

FIGURE 8 is a front elevation of the combination; and

FIGURE 9 is a side elevation of the combination.

DESCRIPTION OF ONE PREFERRED EMBODIMENT

Article of manufacture

The reference numeral 10 indicates generally an integral sink and vanity top combination embodying certain important features of this invention. The combination includes a sink bowl area 11 having an outlet 12a defined by the sink bowl boss 12. Integral in one piece with the sink bowl area 11 is a vanity top 13 (see FIGURE 5). At the rear side of the bowl are a series of openings 14 for the plumbing fixtures. Mounted on the front side of the bowl is an arcuate overflow tube area 15 having an arcuate overflow tube 16 (FIGURE 5) embedded therein. This tube 16 is of an oval cross sectional configuration and of an arcuate shape to follow the contour of the bowl. The side wall of the bowl has an overflow outlet as indicated at 17 in communication with an opening 16a in the overflow tube to permit fluids to be drained through the overflow outlet 17 and then discharged through a lower end 16b of the overflow tube which is in communication with sink outlet 12a.

Method and apparatus for manufacture of monolithic sink and vanity top combinations As illustrated in FIGURE 1, the apparatus for manufacture of the combination 10 includes a lower bonnet 20 having a female mold surface 21 of an inverted sink bowl with a large, smooth table top mold surface 22. As shown, the table top 22 has fixed longitudinal dikes or strips 23 that extend the length thereof. Also, at opposite ends of the table top are a pair of transverse dikes or strips 24 which cooperate with the longitudinal strips 23 to contain any material poured onto the mold area. Intermediate of the transverse strips are a series of polished metal transverse bars 25 which are movable longitudinally along the length of the table top 22 to permit vanity tops to be poured having variable longitudinal dimensions. These bars are adjustable by releasing C-clamps 26 at opposite ends thereof and moving the bars 25 longitudinally to adjusted positions and then securing bars 25 by means of the C-clamps 26. The height of the dikes and bars, as illustrated, corresponds to the thickness of the vanity top 13. In addition to the lower fixed bonnet 20, the mold apparatus includes a generally hemispherical upper bonnet 27 that is used as a mold that determines the backside surface of the sink mold. The thickness of the bowls is the measure of the cavity between the bowls when the upper bonnet 27 is aligned and clamped with the lower bonnet 20. In order to mount the upper bonnet with respect to the lower bonnet, the upper bonnet is provided with upper bonnet mounting bars 28—28. The opposite ends of the bars 28—28 are provided with buckle type clamps 29 which are cooperable with hooks 30 that are supported on mounting posts 31 supported on the longitudinal strips 23.

In the process of manufacture of integral sink and vanity top combinations the end casting bars 24—24 are placed on the table 22 and the bars 25 are positioned at intervals corresponding to the desired lengths of the vanity tops. The ends of the bars 24 and the transverse bars 25 are squared in relation to the dikes or strips 23 in production of the combinations like those illustrated, although it will be appreciated the vanity top may be irregularly shaped at its perimeter if an irregularly shaped countertop is desired. The transverse bars and strips 24 and 25 are then clamped to the table top to hold them in adjusted position. The bonnet surface 21, the table top surface 22 and upper bonnet inner surface 27a are then cleaned, waxed and sprayed with a release agent. The bowl mold area 21 and table top area 22 are then gel-coated.

The overflow tube 16 is provided for disposition on the fixed bonnet 21 and when mounted is supported on fixed bonnet ledge 21a at a radially inner end of the tube 16. A drain outlet forming plug 35 is provided for securement on the fixed bonnet at the area of the ledge 21a and held in position by means of a pin 36 at its lower end which extends into a socket 37. In assembly the pin 36 is disposed beneath the ledge 21a of the fixed bonnet 21. The weight of the outlet forming plug 35 bears against a radially inner end of the tube 16 to cooperate with the ledge 21a in resisting separation of the overflow tube. It will be noted that the overflow tube 16 has an angular hook-shaped tip end 16c engaged on longitudinal bar 23 which supports the radially outer end of the overflow tube 16 in spaced relation to the table top mold surface 22 and in spaced relationship to the exterior surface 21a of the fixed bonnet 21. As indicated at the right side of FIGURE 1, the lower bonnet 20 has a pair of female mold surfaces 21 for forming a pair of sink bowls 11 on a single vanity top 13. Two or more of these bowls can be formed on a single vanity top 13 by removing one or more of the transverse bars 25, when desired, depending on the number of bowls desired on the vanity top.

Prior to the securement of the overflow tube 16 on the fixed bonnet 21, the molding mix is then prepared, as later described herein, and then poured over the mold area 21 and the table top mold area 22. This pour can be made along the entire length of the table top or lower mold 20 so that a plurality of sink and vanity top combinations can be contemporaneously poured. After the material is poured and while the material is in liquid form, the overflow tube 16 is mounted on the fixed bonnet 21, as above described, and tube section or radially outer end portion 16d of the hooked end 16c is pushed into the mix and embedded within the material, thereby locking the outer end of the tube in a fixed position upon gelling of the mix comprising the initial pour. The material poured over the bowl mold area will remain on the bowl surface to the thickness of only ⅛" to 3/16" while the table top mold area 22 may be poured to a depth of ¾", as desired. The first mix is then allowed to gel until firm for no more than 30–40 minutes. As the mix is allowed to become firm the table is vibrated by vibrator V until the mix is gelled. The upper bonnet 27 is clamped over the fixed bonnet 21 before the mix is gelled and is held in position by the clamps 29. In the placement of the upper bonnet over the fixed bonnet, it should be noted that the upper bonnet has an arcuate section 27d which is provided for the purpose of enabling the overflow tube 16 to be embedded in the side wall of the sink and that this arcuate section is bulged in a direction away from the fixed bonnet. As the upper bonnet 27 is mounted over the fixed bonnet 21, the arcuate section 27d must be properly aligned in overlying spaced relation with respect to the overflow tube 16. It will be noted that when the upper bonnet 27 is mounted in position for the final pour, its outer bonnet rim 27b is seated on the top side of the table top material previously poured, as indicated at 40. In order to obtain a seal between the upper bonnet rim 27b with the material previously poured at 40, the upper bonnet should be clamped in position while the mix comprising the initial pour is in a liquid state before it becomes tacky so that a seal may be established between the outer rim 27b of the bonnet 27 at 40 to prevent the mixture comprising the second pour from escaping at the outer rim juncture of the upper bonnet 27 at 40. A measured second mix is then poured into a funnel 27c and a cavity C between the fixed and upper bonnets 21 and 27 is then filled with the second mix. The vibrator V is operated to settle the mix in the cavity C. The vibrator may be of any suitable type.

The material comprising the first and second mixes is then allowed to cure for a minimum of 3 to 4 hours, and overhead heaters can be utilized to accelerate the hardening process. Once the combination 10 has been fully cured, the upper bonnet 27 is unclamped and removed from the table top, as shown in FIGURE 4. Due to the angular configuration of the funnel surfaces, as indicated at 27f and 27g, any excess material at the outlet of the sink bowl may be broken free and removed with the upper bonnet 27. This excess material is indicated generally at 41 in FIGURE 4. It will be noted that the internal funnel surface 27f has a larger diameter at an upper end of the funnel as opposed to its lower end and that the upper end of inner funnel surface 27g has a smaller diameter at its juncture with funnel surface 27f than at its lower end. In view of the shape of these inner funnel surfaces 27f and 27g, the excess material 41 is generally broken at the juncture of the inner funnel surfaces, as indicated at 27h.

In order to remove the formed combination from the table top the end casting bars 24 are detached from the table. Since there is some tendency for the formed combination to stick to the table, the angular end 16c of the overflow tubes 16 may be used as pull tabs to cause the combination to be lifted and detached from the table top. At the time the combination is removed from the mold, the outlet forming plug 35 remains integral with the thus formed part and may be freed threfrom by striking the pin end 36 of the plug and causing the plug to be moved in a direction indicated by the arrow 42, as shown in FIGURE 4. After the combination has been removed from the mold, it is finished by grinding any excess material from the outlet boss 12. The angular end 16c of the overflow tube is cut off. The overflow holes 17 and 16a are then bored, as shown in FIGURE 5. Still further, the drain outlet 12a is also bored to cut off the inner end of the overflow tube that projects into the drain outlet.

Formulations for filled polyester mix used in integral sink and vanity combinations In connection with the mixtures used in the first and second pours previously described, it will be appreciated that the same mixture can be used throughout, if desired. In other words, both pours can be of a solid color mix or both pours can be made of a marble mix, if desired. Preferably, however, the first pour is made with a marble mix which includes pigmenting material for creating a desired marbelized effect in the upper surface of the vanity top. Various types of pigmenting materials may be used to achieve different pigmented effects in the upper surface of the vanity top. Listed below are three different mixes which can be used with excellent results, depending on the type of product or combination to be produced.

(I) Marble mix for first and second pours—

(a) Base mix:

|  | Percent |
|---|---|
| (1) Polyester, epoxy or other thermosetting resin | 30–35 |
| (2) 140–150 mesh ground silica flour | 20–35 |
| (3) Onyx sand fines 150 to 10 mesh random selection | 30–30 |
| (4) Colloidal silica (thixotropic agent) | .2 |
| (5) Inorganic pigment | 4–6 |

(b) Marble veining mix:

| (1) Polyester, epoxy or other thermosetting resin | 30 |
|---|---|
| (2) Onyx sand fines 150 to 10 mesh random selection | 60 |
| (3) Inorganic pigment | 10 |

(II) Solid color mix for first and second pours—

| (a) Polyester, epoxy or other thermosetting resin | 30–35 |
|---|---|
| (b) 60 mesh silica sand | 20–35 |
| (c) 140–150 mesh ground silica flour | 20–35 |
| (d) Colloidal silica thixotropic agent | .2 |
| (e) Inorganic pigment | 4–6 |

(III) Aggregate mix for first and second pours—

| (a) Polyester, epoxy or other thermosetting resin | 30–35 |
|---|---|
| (b) Natural colored aggregate #0° size to 16 mesh | 20–35 |
| (c) 140 mesh ground silica | 20–35 |
| (d) Colloidal silica thixotropic agent | .2–.5 |
| (e) Inorganic pigment. |  |

The features of the above formulations are:
(1) Improved physical properties of the cast material through the use of silica fillers.
(2) Stain moisture resistance is excellent as silica is non-absorbent and inert.
(3) Heat resistance (cigarette burns) is increased through using silica which acts somewhat as a heat sink and is inert.

Typical physical properties are—

| Tensile | p.s.i. | 1,500 |
|---|---|---|
| Compression | p.s.i. | 13,000 |
| Hardness, Barcol |  | 55–60 |
| Abrasion resistance w/H18 wheel | g. | 1.93 |

The use of various meshes or filler allows proper stacking of the aggregate to reduce settling or classification due to mold vibration. The colloidal silica is used as an additive also to prevent settling. Settling is not desired as it will unbalance the cast material, i.e., the lower surface will have a different density than the upper surface. This will also change the resin content through the strata of the casting. As resin shrinks 5–7% during cure, any change of resin content through the casting will cause differential forces to be present during cure. This will result in the part being warped unless restrained either by a matched mold or fixtures or through the shape of the part itself, i.e., two-way curvature.

The use of heavier aggregate in the marble mixture tends to break up the marble veining into a more decorative effect and approaches a natural look.

The top surface of the vanity can be made to simulate marble, travertine, slate or other natural textures by the use of different types of so-called veining mixture.

There is considerable advantage, from one standpoint of increasing the production rate of sink and vanity top combinations, in providing a fixed lower bonnet table which may be 30 to 40 feet long having a series of inverted bowl mold areas thereon supported by the transversely spaced bars 25 so that a series of sink and vanity top combinations can be contemporaneously formed. By practicing our method, it is no longer necessary for the mixtures comprising the first and second pours to be individually mixed for each sink and vanity combination. The disclosed molds enable ten or more sink and vanity combinations to be contemporaneously formed, as desired.

One of the important advantages and features of the method here disclosed relates to our discovery that when the first and second pours of material are made in the manner described and where the second pour is applied to the first pour after the first pour becomes tacky, a complete bonding of the two pours occurs so that a single homogeneous combining of the materials of the first and second pours occurs. On examination of the finished product it is found that the materials of the first and second pours have completely merged together so that the resulting product is free of laminations and comprises a single layer of material. It has been found that the one-layered combination is not only attractive in appearance but also has great strength, thus enabling the product to be well adapted for use in its intended manner.

Although minor modifications might be suggested by those versed in the art, it should be understood that we wish to embody within the scope of the patent warranted hereon, all such modifications as reasonably and properly come within the scope of our contribution to the art.

We claim:
1. A process for forming a sink bowl and top combination comprising:
mixing a mixture including a mineral filler and a polyester resin and shaping a first pour of the mixture in the form of an integral sink bowl and top combination with the sink bowl area being inverted relative to the top at its perimeter,
mounting an overflow drain tube over the inverted sink bowl area and embedding a portion of the tube in the mixture while in a liquid state,
pouring a second pour of the mixture onto the sink bowl area while the first pour is still in a tacky state and confining the flow of the second pour on the sink bowl area and thus embedding the drain tube in the poured mixture comprising the first and second pours, hardening the poured mixtures, removing the sink bowl and top combination from the confinement, and
boring a hole into the sink bowl area and into the overflow tube at an area adjacent the top.

2. The process of claim 1 further characterized by contemporaneously forming a series of sink bowl and top countertop combinations in side-by-side relation.

3. The process of claim 1 further characterized by shaping the overflow drain tube so as to have a shape approximating the curvature of the sink bowl area to facilitate embedding the tube in the pours of the mixture.

4. The process of claim 1 further characterized by providing the overflow tube with a hooked end and controlling the shaping of the pours so that a portion of the hooked end projects exteriorly from an underside of the combination and utilizing the hooked end to aid in removal of the formed combination from a mold used to aid in molding of the combination.

5. The process of claim 1 further characterized by forming a drain outlet in the sink bowl area by controlling the first and second pours to leave a drain outlet area free of the mixture and with an inner end of the drain tube being positioned in communication with the drain outlet area.

6. In a process of forming a sink bowl and vanity top combination, the step of:
providing a mold shaped for formation of the combination including an inverted bowl-shaped mold area and a vanity top shaped mold area,
applying a release agent to the mold areas,
applying a gel-coat to the mold areas,
mixing a mixture comprising a marbelizing material and a polyester resin and applying this mixture to the mold and over the bowl-shaped and vanity top shaped areas while vibrating the mixture,
allowing the applied mixture to gel,
applying a bonnet over the bowl-shaped area with its rim engaged against the mixture while in a tacky state,
securing the bonnet rim and the perimeter of the bowl-shaped area in sealed relation,
applying a second layer of a marbelizing material and polyester resin mixture through the bonnet over the previously coated bowl-shaped area, and separating the combination from the mold.

7. In a process of forming a sink bowl and vanity top combination, the steps of:
providing a mold shaped for formation of the combination including an inverted bowl-shaped mold area and a vanity top shaped mold area,
applying a release agent to the mold areas,
applying a gel-coat to the mold areas,
mixing a mixture comprising a marbelizing material and a polyester resin and applying this mixture to the mold and over the bowl-shaped and vanity top shaped areas while vibrating the mixture,
mounting an overflow drain tube over the inverted bowl-shaped mold area,
allowing the applied mixture to gel,
applying a bonnet over the bowl-shaped area and over the drain tube with its rim engaged against the mixture while in a tacky state,
securing the bonnet rim and the perimeter of the bowl-shaped area in sealed relation,
applying a second layer of a marbelizing material and polyester resin mixture through the bonnet over the previously coated bowl-shaped area thus embedding the drain tube in a side wall area of the sink bowl to form the aforesaid combination while vibrating the mixture, and
separating the combination from the mold.

8. The process of claim 7 further characterized by mounting a drain outlet forming plug on said inverted bowl-shaped mold area with one end of the overflow drain tube being secured between the plug and a portion of the inverted bowl-shaped mold area.

9. The process of claim 8 further characterized by the step of separating the combination from the mold with the plug being attached to the thus formed combination, then striking the plug to detach the plug from the combination, boring the drain outlet to cut away the portion of the drain tube extending in the outlet, and grinding a bottom side of the bowl-shaped area adjacent the drain outlet.

10. The process of claim 7 further characterized by drilling an overflow outlet through a side wall of the sink bowl area and through one wall of the overflow tube at an area generally adjacent the vanity top.

11. In a process of contemporaneously forming a series of sink bowl and vanity top combinations, the steps of:
providing a mold shaped for formation of the combinations including inverted bowl-shaped mold areas and vanity top shaped mold areas with each vanity top shaped mold area having one or more of the inverted bowl-shaped mold areas associated therewith,
applying a release agent to the mold areas,
applying a gel-coat to the mold areas,
mixing a mixture comprising a marbelizing material and a polyester resin and applying this mixture to the molds and over the bowl-shaped and vanity top shaped areas while vibrating the mixture,
mounting overflow drain tubes over the inverted bowl-shaped mold areas,
allowing the applied mixture to gel,
applying bonnets over the bowl-shaped areas and over the drain tubes with bonnet rims engaged against the mixture while in a tacky state,
securing the bonnet rims and the perimeter of the bowl-shaped areas in sealed relation,
applying a second layer of a marbelizing material and polyester resin mixture through the bonnets over the previously coated bowl-shaped areas thus embedding the drain tubes in side wall areas of the sink bowls to form the aforesaid combinations while vibrating the mixture, and
separating the combinations from the molds.

12. The process of claim 11 further characterized by providing a plurality of bowl-shaped mold areas on at least one vanity top shaped mold area for forming a combination having a plurality of bowl-shaped areas.

13. In a process of forming a sink bowl and top combination, the steps of:
providing a mold shaped for formation of the combination including an inverted bowl-shaped mold area and a top-shaped mold area,
pre-coating the mold areas with a release agent and a gel-coat,
mixing a mixture comprising a marbelizing material with a mineral filler and a polyester resin and applying this mixture to the mold and over the bowl-shaped and top-shaped areas,
mounting an overflow drain tube over the inverted bowl-shaped mold area and embedding a portion of the tube in the mix while in a liquid state,
applying a bonnet over the bowl-shaped area and over the drain tube with its rim engaged against the mixture while in a tacky state,
securing the bonnet rim and the perimeter of the bowl-shaped area in sealed relation to provide a dam at the bonnet rim,
applying a second layer of a marbelizing material and polyester resin mixture through the bonnet over the previously coated bowl-shaped area confining the second layer by the dam thus embedding the drain tube in a side wall area of the sink bowl to form the aforesaid combination, and
separating the combination from the mold.

References Cited

UNITED STATES PATENTS 3,078,249   2/1963   Russell _____ 260—40

FOREIGN PATENTS 572,237   3/1959   Canada.
1,152,045   7/1963   Germany.

ROBERT F. WHITE, *Primary Examiner.*

K. J. HOVET, *Assistant Examiner.*

U.S. Cl. X.R.

4—187; 264—156, 162, 245, 255, 271